Jan. 14, 1969 R. E. VON BERG 3,421,340
POD MOUNT TRANSPORT REFRIGERATION SYSTEM
Filed April 26, 1967 Sheet 1 of 3
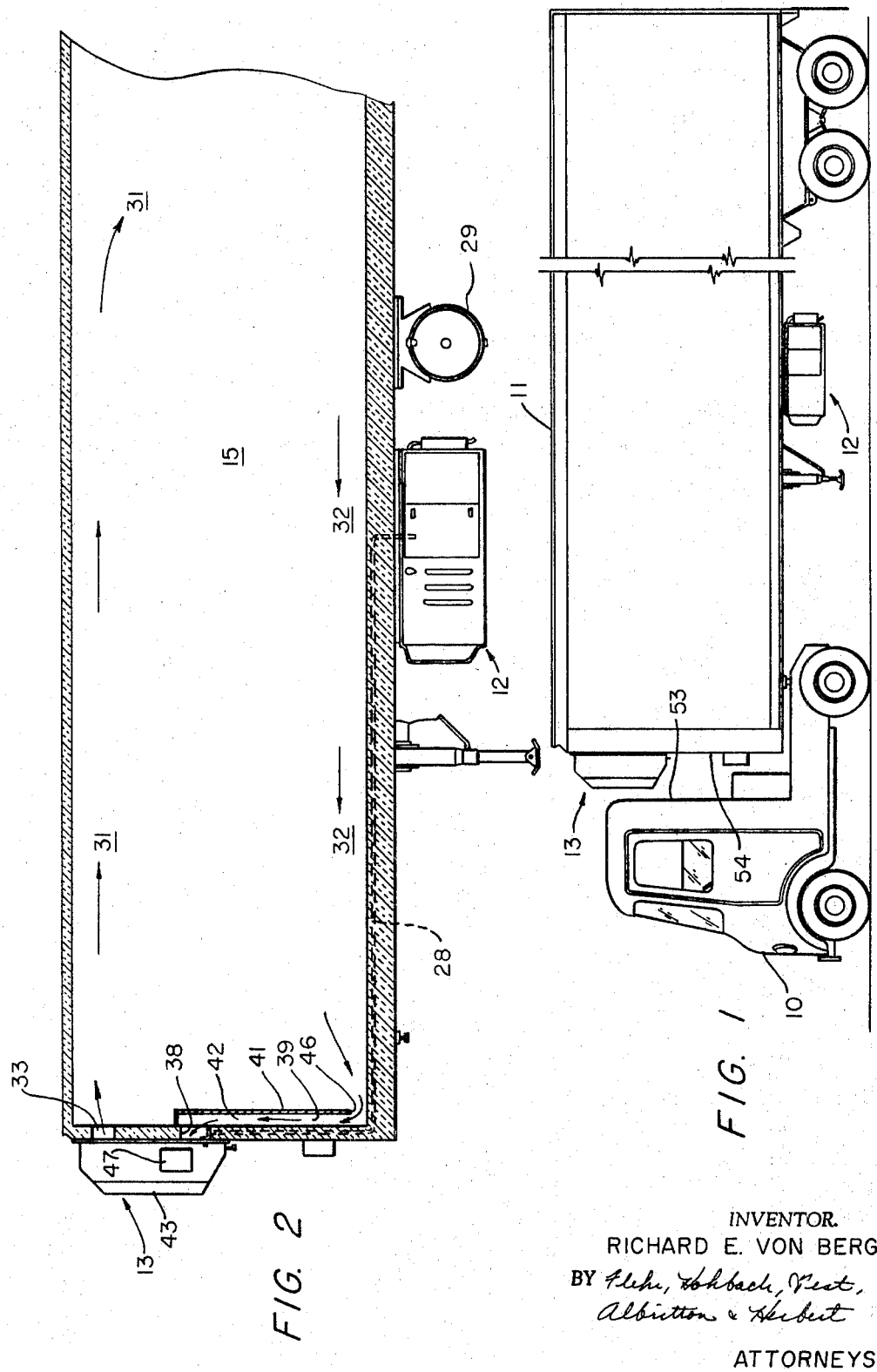
INVENTOR.
RICHARD E. VON BERG
BY Flehr, Hohbach, Test,
Albritton & Herbert
ATTORNEYS

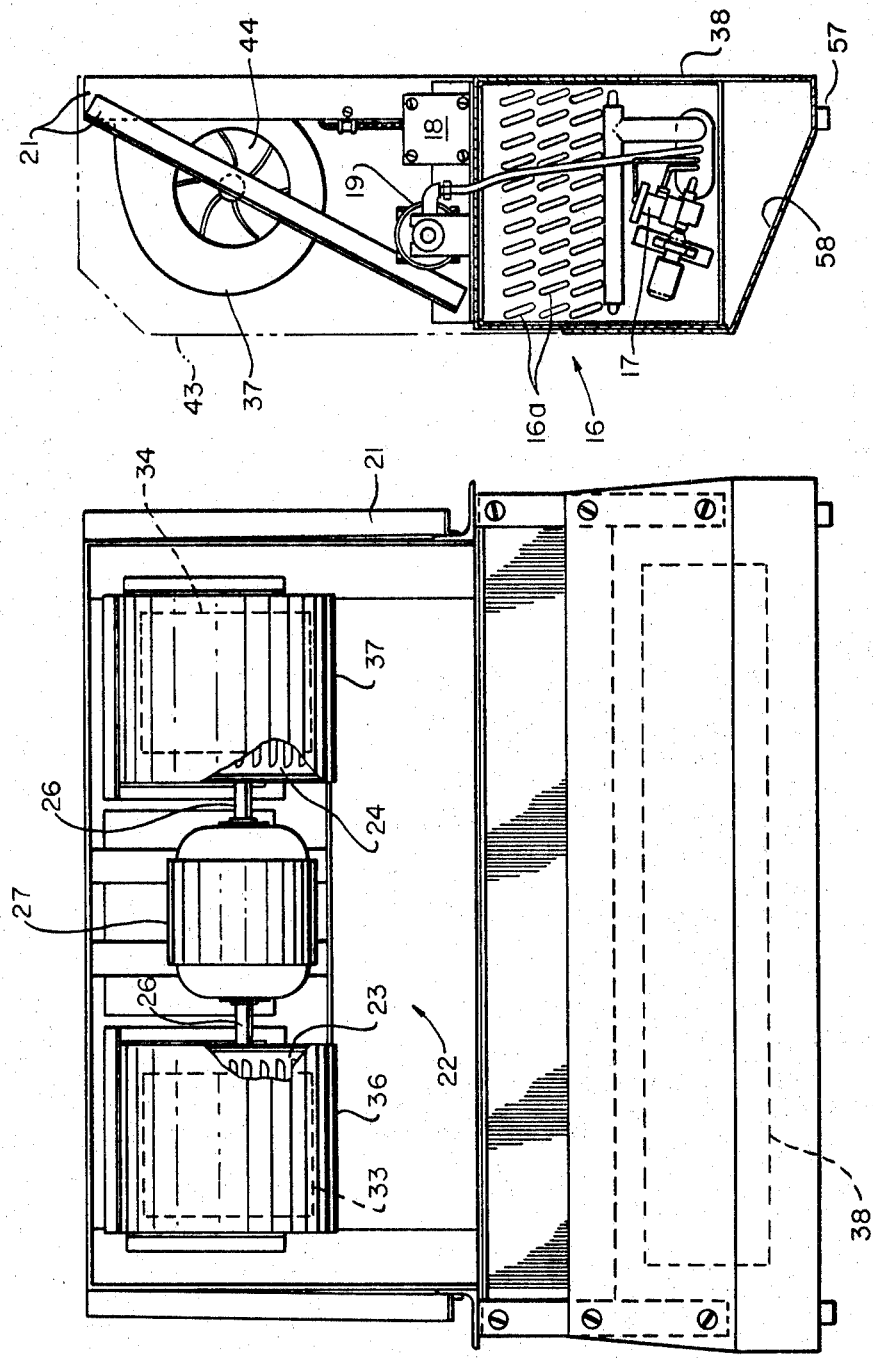

United States Patent Office 3,421,340
Patented Jan. 14, 1969

3,421,340
POD MOUNT TRANSPORT REFRIGERATION SYSTEM
Richard E. Von Berg, Santa Ana, Calif., assignor to Transicold Corporation, Montebello, Calif., a corporation of California
Filed Apr. 26, 1967, Ser. No. 633,930
U.S. Cl. 62—239                                 9 Claims
Int. Cl. B60h 3/04; F25d 19/00; F25d 17/06

ABSTRACT OF THE DISCLOSURE

The evaporator unit of a transport refrigeration system and the evaporator blower are mounted outside the refrigerated load compartment. Circulating air leaves the load compartment to pass through the evaporator unit, and the blower discharges air into the load compartment. A removable cover on the evaporator unit forms part of the circulatory path and, when removed, the circulation of air will be interrupted. The vertical corner edges of the cover are relieved to permit close spacing between tractor and trailer without limiting the turning capability of the rig. A bulkhead spaced from an interior wall within the load compartment forms an air duct to the evaporator unit. The remaining components of the system are carried beneath the load compartment.

Background of the invention and objects

This invention pertains to a transport refrigeration system popularly referred to as a "nose-mount" system of the type normally carried on the leading outside wall of the load compartment of the transport rig. More particularly, this invention pertains to a transport refrigeration system of the foregoing type wherein the evaporator unit of the system has been disposed exteriorly of the load compartment in a manner providing unusual advantages.

It is a general object of the present invention to provide an improved transport refrigeration system characterized by significant advantages of accessibility and providing efficient utilization of space allotted thereto.

It is a more particular object of the present invention to increase the cargo-carrying capacity of a given load compartment by locating refrigeration units exteriorly of the load compartment.

Another object of the invention is to provide, in a transport refrigeration system, an evaporator unit and associated blower disposed for relatively easy access for effecting inspection and maintenance thereof without requiring maintenance personnel to enter the load compartment of the transport vehicle.

It is a further object of the invention to provide a transport refrigeration system of the type described, wherein, for purposes of maintenance, inspection, or otherwise, the removal of a protective cover carried about the evaporator unit and its associated blower serves to interrupt the circulatory air path of the system whereby the evaporator unit can be operated without affecting conditions within the load compartment.

These and other objects of the invention will become more readily apparent from the following description of a preferred embodiment according to the invention which may be generally summarized as follows:

Summary of the invention

In general, according to the invention, there is provided a transport refrigeration arrangement of a type employing an elongated commodity compartment, such as a semi-trailer, which is to be refrigerated. An evaporator unit of the refrigeration system is carried externally of the commodity compartment. The evaporator unit is disposed in a position to be readily accessible for inspection from outside the commodity compartment. According to the system, air is circulated along a path initially discharging along an upper zone of the commodity compartment. The air returns along a lower zone of the compartment and then moves upwardly and is drawn outside the compartment by the blowers of the evaporator unit. The air then passes through the coils of the evaporator unit and, thereafter, the air is again discharged along the upper zone of the commodity compartment.

The foregoing general summary of the apparatus is embodied more particularly in the following detailed description which will be more readily understood when considered in conjunction with the accompanying drawings in which:

FIGURE 1 is a side elevation view of a truck and trailer equipped with a transport refrigeration system, according to the invention;

FIGURE 2 is a side elevation view, partly in section, disclosing the interior of a semi-trailer vehicle, according to the invention;

FIGURE 3 is a front elevation view, partially broken away, showing a portion of a refrigeration system with covers removed, according to the invention;

FIGURE 4 is an end elevation view of apparatus shown in FIGURE 3; and

Description of the preferred embodiment

Figure 5:
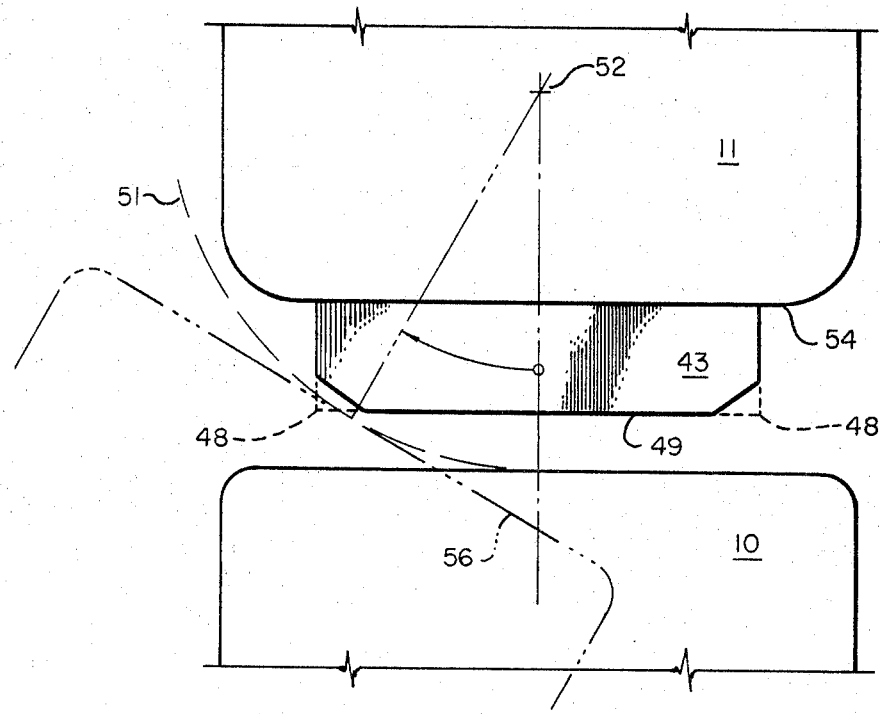
FIGURE 5 is a diagram in plan view of apparatus, according to the invention for demonstrating features thereof.

Referring to the drawings, in FIGURES 1 and 2, a transport trailer rig, of a type comprising a tractor vehicle 10 pivotally coupled to draw a semi-trailer vehicle 11 has been shown equipped with a transport refrigeration system split generally into an undermount portion 12 carried beneath semi-trailer vehicle 11 and a nose mount portion 13 carried on the front wall 54 of semi-trailer 11 for cooling the commodity compartment 15 of vehicle 11.

The undermount portion consists, generally, of those components of the refrigeration system such as a compressor, a condenser unit, and associated units. The nose mount portion 13 contains an evaporator unit 16 (characterized by the coils 16a), an expansion valve 17, an electrical panel 18, pressure differential switch 19, and other associated components, such as a defrost thermostat (not shown), all supported on an angle-iron framework 21 adapted to be secured to front wall 54. Conduits 28 run between the undermount portion 12 of the system and the nose mount portion 13. Conduits 28, therefore, provide the usual liquid line, suction line and other piping between the two portions of the system, as well as the electrical lines therebetween.

Framework 21 further supports a blower assembly 22 comprised of a pair of centrifugal blowers 23, 24 mounted upon a common shaft 26 to be driven by an electric motor 27.

A fuel tank 29 is carried beneath semi-trailer 11.

Means are provided for forming a recirculation path for air to be cooled by evaporator unit 16. The recirculation path discharges along an upper zone 31 of commodity compartment 15 of vehicle 11, returns along a lower zone 32 of compartment 15, and then moves upwardly to be drawn outside compartment 15 and into unit 16 where it is thereafter again discharged along zone 31.

Thus, discharge ports 33, 34 are formed through wall 54 and are respectively associated with blowers 23, 24. Each blower 23, 24 is generally covered by an associated hood 36, 37 adapted to be coupled respectively to ports 33, 34 for directing the stream of air from each blower 23, 24 into compartment 15.

The cooled air discharging from ports 33, 34 along the upper zone of compartment 15 moves toward the rear of vehicle 11. This air will circulate between portions of the product load in vehicle 11 and will return via lower zone 32 of compartment 15 as now to be described.

Means forming a return port through wall 54 comprises an opening 38 formed through an upper portion of wall 54 and also an upstanding duct 39 extending downwardly from opening 38 so as to draw air from zone 32. Duct 39 is formed by a bulkhead 41 spaced from wall 54 inside compartment 15 and by laterally spaced upstanding studs 42 which serve to support bulkhead 41 spaced from wall 54. Bulkhead 41, thus, forms and preserves duct 39 with very little encroachment into cargo carrying volume of compartment 15.

Thus, bulkhead 41 extends only a relatively short distance into the commodity compartment 15 and accordingly takes up considerably less space within compartment 15 than might otherwise occur using a conventional nose mount system of a type, for example, wherein the evaporator coils and fans are located within compartment 15. By terminating bulkhead 41 somewhat short of the floor of vehicle 11, a flow passage 46 is formed whereby air will be drawn from zone 32 into duct 39 by operation of blowers 23, 24.

A portion of the recirculatory air path is defined via nose mount assembly 13 including a portion through evaporator coils 16a and blowers 23, 24. However, a readily removable insulated cover enclosure 43 is secured about blower assembly 22 and sealingly engages a neoprene gasket (not shown) bordering framework 21 on front wall 54.

Thus, when cover 43 has been attached, the recirculatory air path will be completed and defined via return opening 38, evaporator coils 16a, the axially open ends 44 of blower hoods 36, 37 and thence will discharge via ports 33, 34.

Thus, it will be apparent that cover 43 cooperates with wall 54 and is disposed about evaporator unit 16 and blower assembly 22 to form a portion of the recirulatory air flow path whereby removal of cover 43 from the nose mount portion 13 will serve to interrupt the air flow path at a point externally of the commodity compartment 15.

Thus, after electrically disconnecting motor 27 by a maintenance switch (not shown), such as an interlock or otherwise, evaporator unit 16 can be fully operated without affecting conditions within compartment 15.

Cover 43 further includes an inspection and maintenance access door 47 which will, therefore, be located outside compartment 15 and disposed in a position to allow inspection and servicing of the defrost thermostat, expansion valve 17, and differential pressure switch 19 without removal of cover 43.

Inasmuch as cover 43 forms a portion of the recirulatory air path for cooled air of commodity compartment 15, cover 43 is suitably insulated, for example, with polyurethane foam.

Cover 43 has been further constructed to take additional advantage of the fact that relatively few components of the refrigeration system need be carried on front wall 54. More particularly, cover 43 has been formed with relieved upstanding corner edges 48 whereby the entire outer upstanding surface 49 of cover 43 will lie within an arc 51 as struck from the pivotal coupling point 52 forming the pivotal connection between tractor 10 and trailer 11.

Accordingly, and referring particularly to FIGURE 5, it will be apparent that cover 43 is disposed between wall 54 and the confronting surface 53 of tractor 10. Tractor 10 is pivotally coupled in tandem to trailer 11. The confronting upstanding surfaces 53, 54 (and 49) respectively of tractor 10 and trailer 11 are arranged whereby one will move relative to the other in a predetermined arc 51 to a position, for example, represented by the phantom line 56. From inspection of the diagram in FIGURE 5, it will be observed that by relieving the corners of cover 43, the pivotal movement of tractor 10 relative to trailer 11 will not be limited by engagement between surface 53 and cover 43. Thus, cover 43 lies entirely within the arc struck by surface 53 during such pivotal movement. Accordingly, tractor 10 and trailer 11 can be quite closely spaced relative to each other without impairing the degree to which tractor 10 can turn relative ot its associated trailer as would thereby restrict the turning radius of the rig.

If desired, the air discharged along the upper zone 31 of the elongated cargo compartment 15 may be carried by means of nylon ducts (not shown) attached to the ceiling of the compartment.

Drains 57 are formed in the bottom of the enclosure formed mainly by cover 43 whereby during a defrost operation, water falling from the then warmed coils 16a of evaporator unit 16 can be drained away without need for further control or piping inasmuch as the downwardly sloping surface of the bottom 58 will merely direct the water downwardly to be discharged via drains 57.

From the foregoing, it will be readily apparent that by employing a split system wherein relatively few components of the refrigeration system are carried as a nose mount assembly and by locating the evaporator unit and its associated blower assembly exteriorly of the cargo compartment, not only will additional cargo capacity be provided, but the evaporator coils and other units will be readily available for inspection and maintenance without, for example, need to unload a portion of the cargo.

Furthermore, work on these units is then readily accomplished in the more comfortable surroundings outside the refrigerated compartment. The thin design of the cover cover 43 makes it possible to operate an articulated vehicle wherein one is quite closely coupled to the other without impairing the degree of articulation permitted between the tractor and trailer.

By providing a bulkhead, closely spaced to the forward wall of the commodity compartment, pallets may be stacked directly against the bulkhead without danger of damaging the evaporator unit as, for example, by shifting cargo or rough handling of pallets.

What is claimed is:

1. In transport refrigeration apparatus of a type having a refrigeration system, apparatus comprising a transport vehicle, means forming a commodity compartment in said vehicle to be refrigerated, an evaporator unit of the refrigeration system, said evaporator unit being carried externally of said compartment and disposed to be accessible for inspection and repair from outside said compartment while in an operable condition, and means forming a recirculation path for air to be cooled by said evaporator unit, said path discharging along an upper zone within said compartment near the ceiling, returning along a lower zone near the floor of the compartment, then moving upwardly and drawn outside said compartment and into said unit and thereafter being again discharged into said compartment along said upper zone.

2. Transport refrigeration apparatus comprising a vehicle, means, including walls of said vehicle, forming a commodity compartment to be refrigerated, an evaporator unit of a refrigeration system carried externally of said vehicular commodity compartment adjacent one wall thereof, said unit including evaporation coils and blower means for moving air via said coils and said compartment, and means forming a recirculatory air flow path into and out of said compartment comprising discharge and return ports formed through said one wall, said discharge port being disposed to direct air along an upper zone of said compartment and said return ports serving to draw air from a lower zone of said compartment, the last said means further including an enclosure cooperating with said one wall and disposed about and supported independently of said coils and blower means to form an external portion of said flow path extending from said return port to said discharge port, said enclosure being readily removable to uncover said evaporator unit and blower means and to interrupt said air flow path at a point externally of said compartment while leaving said evaporator unit and blower means in said system supported adjacent said wall uncovered sufficiently to accommodate access for maintenance and repair from a plurality of sides thereof.

3. Transport refrigeration apparatus as defined in claim 1 wherein said path includes a return port comprising an opening formed through an upper portion of said wall and means forming an upstanding duct extending downwardly from said opening to draw air from along the floor of said compartment.

4. Transport refrigeration apparatus as defined in claim 3 wherein said duct is formed by a bulkhead inside said compartment and spaced from a wall inside said compartment and means serving to support said bulkhead spaced from said wall.

5. Transport refrigeration apparatus as defined in claim 2 wherein said enclosure protrudes from the exterior face of said one wall to be disposed between said one wall and surface portions of a vehicle pivotally coupled in tandem to the first named vehicle, the adjacent upstanding surfaces of the last named said vehicle pivoting along a predetermined arc struck from the pivotal coupling between the first named and last named said vehicles, said enclosure being formed with relieved upstanding corner edges to dispose the entire outer upstanding surface of said enclosure to lie within said arc, said arc transcending the volume so relieved.

6. Transport refrigeration apparatus comprising a first vehicle having a rear wall, a second vehicle pivotally coupled to be drawn by the first vehicle and having a front wall confronting said rear wall, a nose mount refrigeration unit including an evaporator unit and blower means of a refrigeration system carried by one of said walls between said walls, a cover enclosing said unit, the other of said walls moving relative to said one wall laterally in an arc struck from a pivotal coupling, said cover being formed with relieved upstanding corner edges to dispose the entire outer upstanding surface of the cover to lie within said arc, said arc transcending the volume so relieved.

7. Transport refrigeration apparatus as defined in claim 6 wherein said front wall serves to carry said unit.

8. Transport refrigeration apparatus according to claim 6 further including coils of said evaporator unit within said cover, air flow discharge and supply passages formed through said front wall in communication with the spaces enclosed by said cover and respectively above and below said evaporator coils, and drain ports formed in the bottom of said cover adapted to permit liquid to directly escape when defrosting said evaporator.

9. Transport refrigeration apparatus according to claim 6 wherein the remaining units of said refrigeration system are carried exteriorly of said second vehicle.

References Cited
UNITED STATES PATENTS

| | | | |
|---|---|---|---|
| 2,263,476 | 11/1941 | Sunday | 62—239 |
| 2,410,449 | 11/1946 | Kleist | 62—239 |
| 2,525,868 | 10/1950 | Corhanidis | 62—449 |
| 2,660,865 | 12/1953 | Durant | 62—239 |
| 3,057,284 | 10/1962 | Darmont | 62—239 |

WILLIAM J. WYE, *Primary Examiner.*

U.S. Cl. X.R.

62—449, 419